US010125002B2

(12) United States Patent
Volftsun

(10) Patent No.: US 10,125,002 B2
(45) Date of Patent: Nov. 13, 2018

(54) BEVERAGE DISPENSING SYSTEM

(71) Applicant: Lev Volftsun, McLean, VA (US)

(72) Inventor: Lev Volftsun, McLean, VA (US)

(73) Assignee: SESTRA SYSTEMS, INC DE (US)

( * ) Notice: Subject to any disclaimer, the term of this patent is extended or adjusted under 35 U.S.C. 154(b) by 349 days.

(21) Appl. No.: 14/686,820

(22) Filed: Apr. 15, 2015

(65) Prior Publication Data

US 2016/0257549 A1     Sep. 8, 2016

Related U.S. Application Data

(60) Provisional application No. 62/023,899, filed on Jul. 13, 2014.

(51) Int. Cl.
*B67D 1/00*     (2006.01)
*B67D 1/04*     (2006.01)
*B67D 1/08*     (2006.01)
*B67D 1/12*     (2006.01)

(52) U.S. Cl.
CPC ............ *B67D 1/0007* (2013.01); *B67D 1/04* (2013.01); *B67D 1/0855* (2013.01); *B67D 1/0884* (2013.01); *B67D 1/1281* (2013.01); *B67D 1/0888* (2013.01); *B67D 1/0895* (2013.01); *B67D 1/1247* (2013.01); *B67D 2210/00089* (2013.01); *B67D 2210/00118* (2013.01)

(58) Field of Classification Search
CPC ....... G01F 11/02; B67D 1/0045; B67D 1/107; B67D 1/0027; B67D 1/08; B67D 1/00; B67D 1/04; B67D 7/06; B67D 7/08; B67D 7/22; B67D 2210/00089; B67D 2210/00118; B67D 1/1247; B67D 1/0895; B67D 1/0888; B67D 1/1281; B67D 1/0884; B67D 1/0855; B67D 1/0007

USPC ........ 222/129–137, 145.5–145.6; 137/87.05, 137/110–111
See application file for complete search history.

(56) References Cited

U.S. PATENT DOCUMENTS

| | | | | |
|---|---|---|---|---|
| 3,283,957 A | * | 11/1966 | Henderson | B01F 15/0416 137/101.21 |
| 3,370,759 A | * | 2/1968 | Johansson | B65B 3/32 222/249 |
| 3,552,606 A | | 1/1971 | Kraft et al. | |
| 3,591,051 A | * | 7/1971 | Mitchell | B67D 1/0016 200/83 A |
| 3,830,405 A | | 8/1974 | Jaeger | |
| 4,507,128 A | * | 3/1985 | Werner | F17D 5/02 137/1 |
| 4,638,924 A | * | 1/1987 | Newsom | A01C 23/042 137/106 |

(Continued)

FOREIGN PATENT DOCUMENTS

GB      1342285      1/1974

*Primary Examiner* — Paul R Durand
*Assistant Examiner* — Andrew P Bainbridge
(74) *Attorney, Agent, or Firm* — John D. Gugliotta

(57) ABSTRACT

A system and method for the automated dispensing of bulk keg wine is provide having, in combination: integrated temperature control; pressure monitoring; automated purging; and integrated point of sale data acquisition for determining inventory usage statistics for each keg of wine dispensed. The system provides for precise measurement of each portion. An error alarm system warns an operator about beverage tank low level. A system for forcing the flashing of poor quality beverage. Recording of all delivery process events allows for operator or management review and control.

17 Claims, 17 Drawing Sheets

(56) References Cited

U.S. PATENT DOCUMENTS

| | | | | |
|---|---|---|---|---|
| 4,886,190 A * | 12/1989 | Kirschner | ............ | B67D 1/0037 |
| | | | | 222/129.1 |
| 4,940,164 A * | 7/1990 | Hancock | ............. | B01F 3/04241 |
| | | | | 222/146.6 |
| 5,121,855 A * | 6/1992 | Credle, Jr. | ........... | B67D 1/0044 |
| | | | | 137/99 |
| 5,172,831 A * | 12/1992 | Burrows | ............. | B67D 1/1243 |
| | | | | 222/1 |
| 5,181,631 A * | 1/1993 | Credle, Jr. | ........... | B67D 1/0027 |
| | | | | 141/362 |
| 5,381,926 A * | 1/1995 | Credle, Jr. | ........... | B67D 1/0032 |
| | | | | 222/1 |
| 5,588,813 A * | 12/1996 | Berke-Jorgensen | ... | B67D 1/107 |
| | | | | 417/391 |
| 6,231,322 B1 * | 5/2001 | Adolfsson | ............. | B67D 1/004 |
| | | | | 261/35 |
| 6,347,934 B1 * | 2/2002 | Andersen | ............. | B29C 31/063 |
| | | | | 425/557 |
| 6,435,375 B2 * | 8/2002 | Durham | ............... | B67D 1/0032 |
| | | | | 222/129.1 |
| 6,792,965 B2 * | 9/2004 | Kunkler | .................... | F15C 3/06 |
| | | | | 137/100 |
| 7,451,895 B2 * | 11/2008 | Newton | ............... | B01F 5/0496 |
| | | | | 222/105 |
| 7,757,908 B1 * | 7/2010 | Buhl, Jr. | ............... | B67D 1/0406 |
| | | | | 141/231 |
| 8,479,955 B2 | 7/2013 | Vesborg et al. | | |
| 2005/0072800 A1 * | 4/2005 | Smith | .................... | B67D 1/104 |
| | | | | 222/129.2 |
| 2008/0189078 A1 | 8/2008 | Vok et al. | | |
| 2008/0202148 A1 * | 8/2008 | Gagliano | ............ | B67D 1/0406 |
| | | | | 62/392 |
| 2010/0089943 A1 * | 4/2010 | Till | ...... | B67D 1/0884 |
| | | | | 222/1 |
| 2014/0361046 A1 * | 12/2014 | Laverdiere | ............. | F04B 13/00 |
| | | | | 222/309 |
| 2015/0027665 A1 | 1/2015 | Cooke | | |
| 2017/0096322 A1 * | 4/2017 | Volftsun | ............... | B67D 1/0007 |

* cited by examiner

BEVERAGE DISPENSING SYSTEM

RELATED APPLICATIONS

The present invention claims benefit of U.S. Provisional Application 61/979,118 filed on Apr. 14, 2014 for a Wine Service and Dispensing Cart, and U.S. Provisional Application 62/023,899 filed on Jul. 13, 2014, both of which are incorporated by reference as if fully rewritten herein. There are no other previously filed, nor currently any co-pending applications, anywhere in the world.

BACKGROUND OF THE INVENTION

1. Field of the Invention

The present invention relates to a system and method for dispensing beverages in a hospitality or other commercial setting, as well as in residential or consumer applications, and, more particularly, to the measurement of, automated pour control, and metered dispensing of beverages under pressure.

2. Description of the Related Art

Recent demographic changes are modifying the pattern of consumption in adult beverages throughout the United States. The Millennial generation (also known as Millennials or Generation Y) are the demographic cohort following Generation X. There are no precise dates when the generation starts and ends, but it is commonly identified as those birth years ranging from the early 1980s to the early 2000s, which includes the youngest legal drinkers. This social cohort are consuming more wine than previous generations when they turn legal drinking age. As a result, wine makers and distributors across the U.S. are seeing both more overall demand, as well as a change in the types of wine they produce. Other changes include the packaging used, as well as market tools to connect their brand with their customers.

One area where this demand is currently placing pressure on current beverage distribution systems is at event venues such as stadiums, arenas and high volume entertainment facilities Beverage delivery of prior preferred beverages has evolved to include bulk containers, distribution tubes or hoses, and dispensing taps or fountains. This can be seen in the delivery of first soft drinks, and then beer.

Because of the nature of soft drinks, technology was adapted to satisfy the post mixing of syrup, water and carbon dioxide in bulk distribution to satisfy dispensing of soft drinks in a manner currently efficient enough for mass venues. As beer became an adult beverage of choice of prior demographic cohort, technology was adapted to eventually satisfy the cleaning, delivery, dispensing and changing of bulk keg beer products. However, these prior bulk beverage delivery systems do not lend themselves directly to the dispensed delivery of wine. Additionally, no existing systems exactly measure the volume of beverages they dispense, but rather make approximations based on weight and/or time. Such approximations lack sufficient precision and can lose their calibration over time.

Beer and wine contain alcohol, and as such are carefully regulated and their distribution carefully controlled and taxed. Further, unlike beer and soda, wine is typically poured to fill only half the glass, rather than the entire glass. Consequently, there is a high tendency to "over pour" and controlled and consistent metering of individual servings is highly desired by the retail vendor to minimize and eliminate such "over pouring". While similar motivations exist for beer, due to the carbonated nature of beer products the amount of waste or commercial spoilage is quite different. Consumers tend to place a lot of importance on beer heads: too much of a head is undesirable because it detracts from the mass of the drink (similar to carbonated soda drinks). But, on the other hand, a beer drink is viewed as incomplete unless it has some head, and there is an expectation of a specific form of head based on the type of beer. Consequently, the automated metering, monitoring and control of beer beverage dispensing currently already estimates between a 5%-15% allocation or credit to accommodate for the inability to exactly meter the liquid and its associated foam.

However, the problem associated with the metering of an "exact" pour is exaggerated, and quite different, with wine. Wine does not foam, has a higher tax value, has a smaller serving size, and is served in stemware in which the cup or bowl is served only partially filled. As an example, a wine glass as defined by the International Standards Organization (ISO) has a capacity of approximately 215 ml, but it is intended to take a 50 ml pour. While other types of wine stemware have differences in shape and size, generally such drink ware lend themselves easily to "over pouring", or dispensing serving amounts in excess of a desired standard. Such overages in the dispensing of wine can easily reach up to between 25%-50%.

Consequently, the need to provide a standardized beverage dispensing system particularly adapted for use in dispensing metered volumes of wine is needed.

"Wine on Tap" is a distribution method for wine that has been developed for high volume dispensing and service applications. However, at an extreme event, such as a professional baseball event servicing 10,000-20,000 spectators, or a professional football event servicing 40,000-60,000 spectators, or a professional soccer event servicing upwards of 100,000 spectators all at a single venue, such systems still exhibit problems associated with consistency of pour, while providing ease of line cleaning and simplicity of keg changeover. In such systems, a typical process of delivering beverage to the customer is controlled by an operator (bartender) through a manual interface. The operator is responsible for the quality and the volume of each portion. For beverages that tend to oxidize, such as wine, the operator is supposed to flash (discharge to waste) one or several portions of the beverage from the delivery line before supplying the good portion to the customer. This manual system relies on the operator only and does not guarantee neither the quality nor the consistency of the required volume size of the beverage portion.

Some methods and devices are known that incorporate various mechanisms for identifying the automated dispensing and metering of beverages as well as determining volumes of keg beverages. For example:

U.S. Pat. No. 3,976,222, issued in the name of Spagnolo, describes a metering device capable of selectively dispensing beverages from several holding tanks. The device includes a counter that identifies the number of beverages, and is intended to deliver a predetermined quantity of the beverage on each pour. However, the quantity is determined through a timed pour urged by hydrostatic head, and not a volumetric measure. Further, the system does not accommodate either flashing or ease of cleaning.

U.S. Pat. No. 8,371,478, issued in the name of Sommerfield et al., describes a system for delivering a pressurized inert gas into wine bottles for dispensing the contents therefrom out through a spigot or tap. However, the system is specifically adapted for use with wine bottles and does not accommodate bulk containers, and merely provides a dispensing urging force and in no way aids in quantity measurement.

U.S. Pat. No. 4,450,987, issued in the name of Boettcher et al., describes a portion control liquid dispenser for delivering cream or non-diary cream substitute in metered volumes from a temperature controlled tank. The system, however, merely dispenses the gravity fed contents from a containment tank, and again estimates volume through the predetermined timed opening of a solenoid valve.

U.S. Pat. No. 5,022,557, issued in the name of Turner, describes a computerized beverage dispensing system that has a flow meter between a pressurized beverage container and a tap or faucet. The system is intended to provide consistency of pour at a preselected volume. Again, while volume is determined through the time measured opening of the dispensing valve, this particular system attempts to improve accuracy through compensation of the time based on the temperature and backpressure of the fluid.

U.S. Patent Publication 2013/0081443, published in the name of Rasmussen et al., describes a method of determining the volume of pressurized beverage in a collapsible beverage container. This system calculates the amount dispensed by measuring volume differentials between deliveries.

U.S. Patent Publication 2012/0059513, published in the name of Perkins et al., describes a beverage dispensing and monitoring system that is purportedly for identifying fluid flow characteristics for external data acquisition. While the reference fails to enable such controls or electronics, the claims appear to be concentrated on the in-line, quick connect nature of the sensor package.

And finally, an international patent publication published as WO 02/48018 describes (in French) a dose dispensing system for wine.

While each of the above references may include some features that are incorporated in part or in combination in the present invention, none provide for an adequate solution to the problem(s) at hand. It is preferable that in a beverage dispensing and pour control system for use with keg wine or other bulk regulated beverage management should have the ability to control the quality and quantity of servings delivered by the operator. The suggested beverage dispensing and pour control system should also provide precise measurement of each portion—not imprecise measurements based on time or weight. Further, such a beverage dispensing and pour control system should warn the operator about beverage tank low level, allow for force flashing of the poor quality beverage and record all the delivery process events in the log for the management.

SUMMARY OF THE INVENTION

It is thus an object of the present invention to provide for more efficient beverage services for home, bars, restaurants or event venues.

It is another object of the present invention to provide a device, system and method for enabling the metered dispensing of any beverage which comes from pressurized containers.

It is yet another object of the present invention to aid in the implementation of an infrastructure to deliver alcoholic or other beverages on tap and in a metered fashion.

It is further still an object of the present invention to provide an automated beverage dispensing system that controls the standardized unit dispensing in the use of alcoholic beverage on tap delivery.

It is still a further object of the present invention to provide a bulk beverage control system that may deliver multiple different beverage types with each being able to be delivered at an appropriate service temperature.

The present application provides an automated beverage dispenser for dispensing a beverage into a drinking vessel. The automated beverage dispenser may include a user interface for operating a metering mechanism. The metering mechanism may have the ability to measure an exact amount of liquid to be dispensed, record the information on a permanent [magnetic] media, sensor[s] for measuring the beverage pressure in the delivery line, a timer and a system of communication for information exchange between the metering mechanism and the user interface. The communication system may include an LCD, a keyboard, a mouse, or even interaction through sequence of blinking lights and buttons. The beverage dispenser may further include wireless communication capability to communicate with a standard PC or smartphone using the wireless protocol (such as Bluetooth, Wi-Fi, Internet, etc.). Bulk beverages from a number of sources can be metered upon demand as urged through a metering chamber of an identified volume by a single system pressure from fluid communication with the bulk beverage container. In addition to eliminating the need to provide an accurate (rather than estimated) dispensed volume of various beverages, the discharge may be dispensed at a temperature correlated as appropriate for the differing dispensed beverages. In such a manner and with such a system, quality and quantity control can be easily accomplished, tracked and reported.

An advantage of the present invention is that is can be adapted for use in the bulk service distribution of precise individual volumes of any beverage, including alcoholic beverages, whether wine, beer, hard liquor or mixed cocktails.

It is another advantage of the present invention to provide for operational functionality utilizing line pressure for dispensing determined volumes, not electrically generated pressure (i.e. dispensing is based upon the existing pressure of the bulk keg beverages, rather than from electrically generated pumping pressure.

It is a further advantage of the present invention to provide for quick plugin component connections to allow for changing bulk beverage containers.

It is yet a further advantage of the present invention to provide for variations in dispensing volumes with a chamber having consistent dimensions such as to provide for a determined volume and for creating variations through movement of a pistons.

It is a further advantage that determined volume changes may be further implemented through differences in piston size, differences in container size, or both.

Further, the present invention provides multiple valves that are synchronized to work in existing line pressure between each two end of the container without changing or adding in-line pressure, and can be accomplished with four 2-way valves; two 3-way valves; one 4-way valve; or an equivalent manifold, or other means of redirecting pressure. Further still, with applications having more than a single input or for mixing liquids, additional valves can be included.

The present invention may be further adapted with a transmitter (Infrared, RF, magnetic, magnetostrictive or other technologies) incorporated into the piston or container in spaced specific intervals corresponding to a desired set measurement unit (e.g. 1 oz. increments) such that calculation of different volumes may be accomplished through movement of the piston along intervals along the chamber.

The present invention may be further adapted such that the piston may further be moved along a partial interval along the chamber such that a fractional volume portion (e.g. ½ oz. increments.

These and further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation. It should be further apparent to a person having ordinary skill in the relevant art, in light of the present teachings, that the discussed enablement being described for use with bulk wine should be considered equivalent for use with any other beverages.

Figure 1:
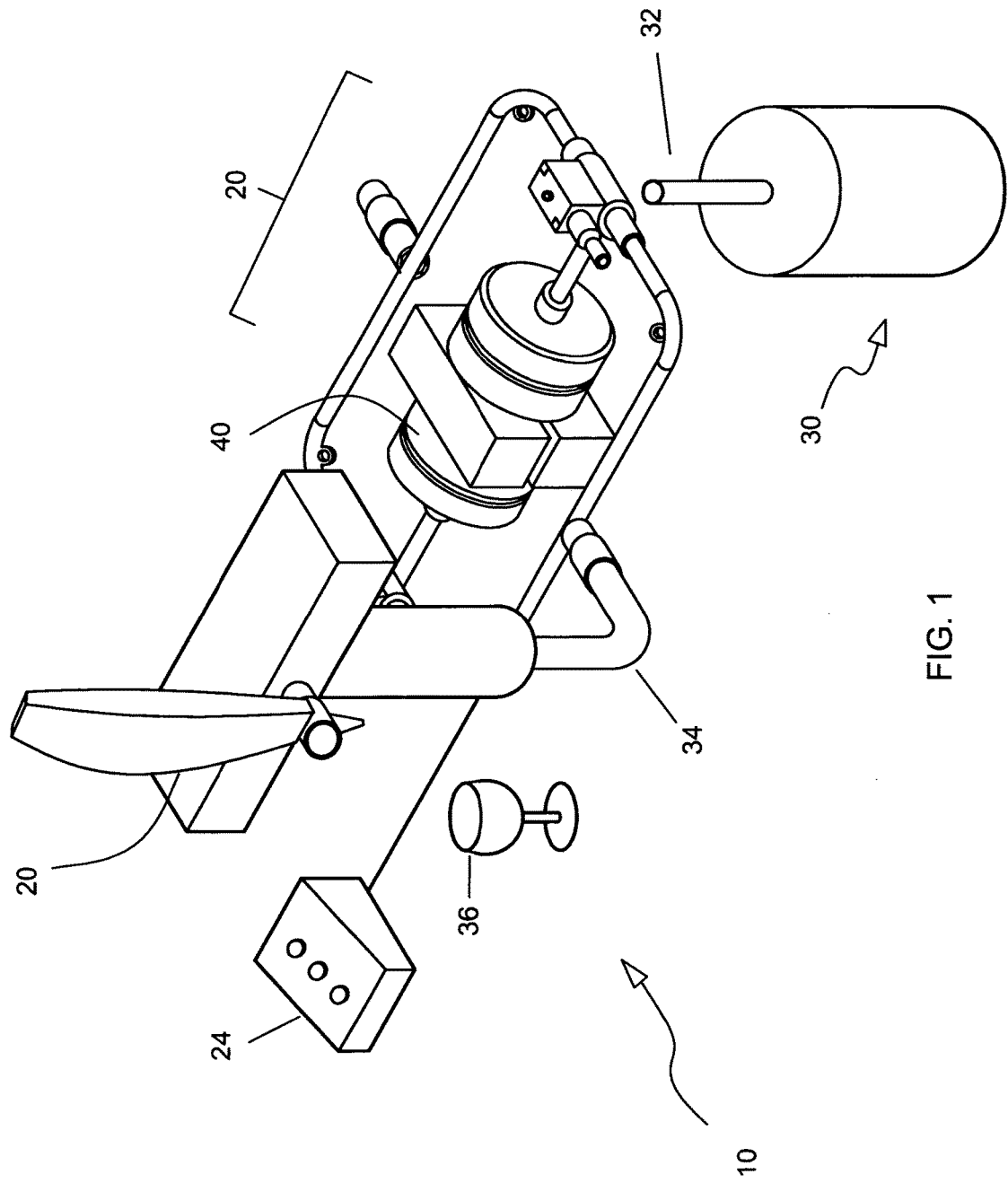
FIG. 1 is a perspective schematic view of a beverage dispensing and pour control system 10 for use with a metering system 20 according to an exemplary preferred embodiment of the present invention.

Referring now to FIG. 1, a perspective schematic view of a beverage dispensing and pour control system or "system", generally noted as 10, is shown as may be described herein. The system 10 may include: a metering mechanism 20; a tap or spigot 22; and a beverage bulk storage and distribution system 30. Generally, the metering mechanism 20 is in fluid communication with a beverage supply 32 in operative connection with the bulk storage and distribution system 30. The metering mechanism 20 also provides for a metered discharge 34 in fluid communication with the tap or spigot 22 in a manner that provides for a beverage specific controlled metered pour into a beverage container 36, as will be described in greater detail below.

Figure 2:
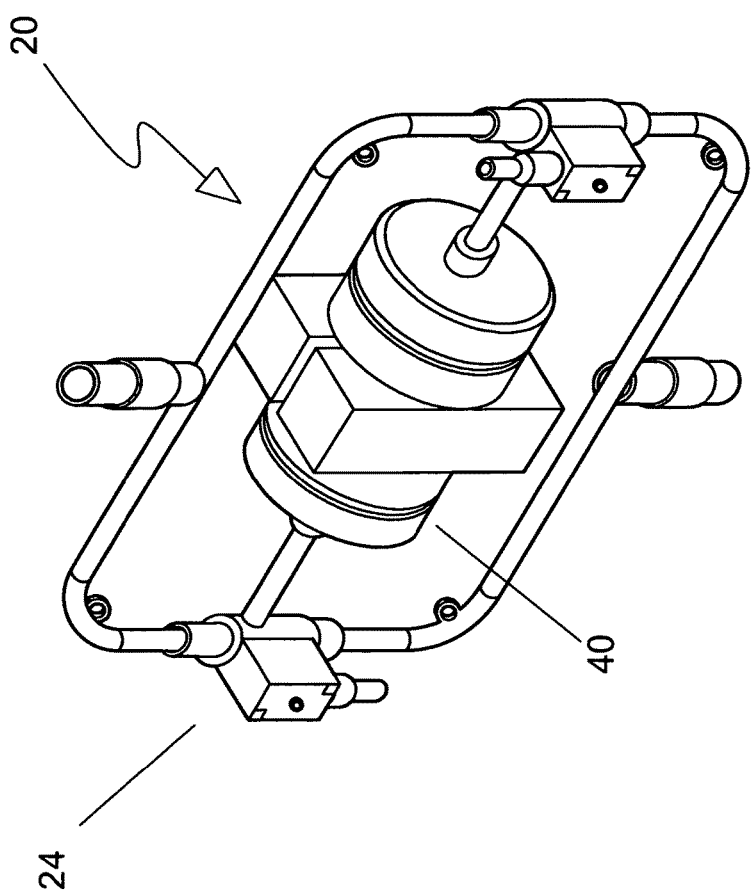
FIG. 2 is detailed perspective view of a metering system 20 for use in the beverage dispensing and pour control system 10 of the present invention.
Figure 3:
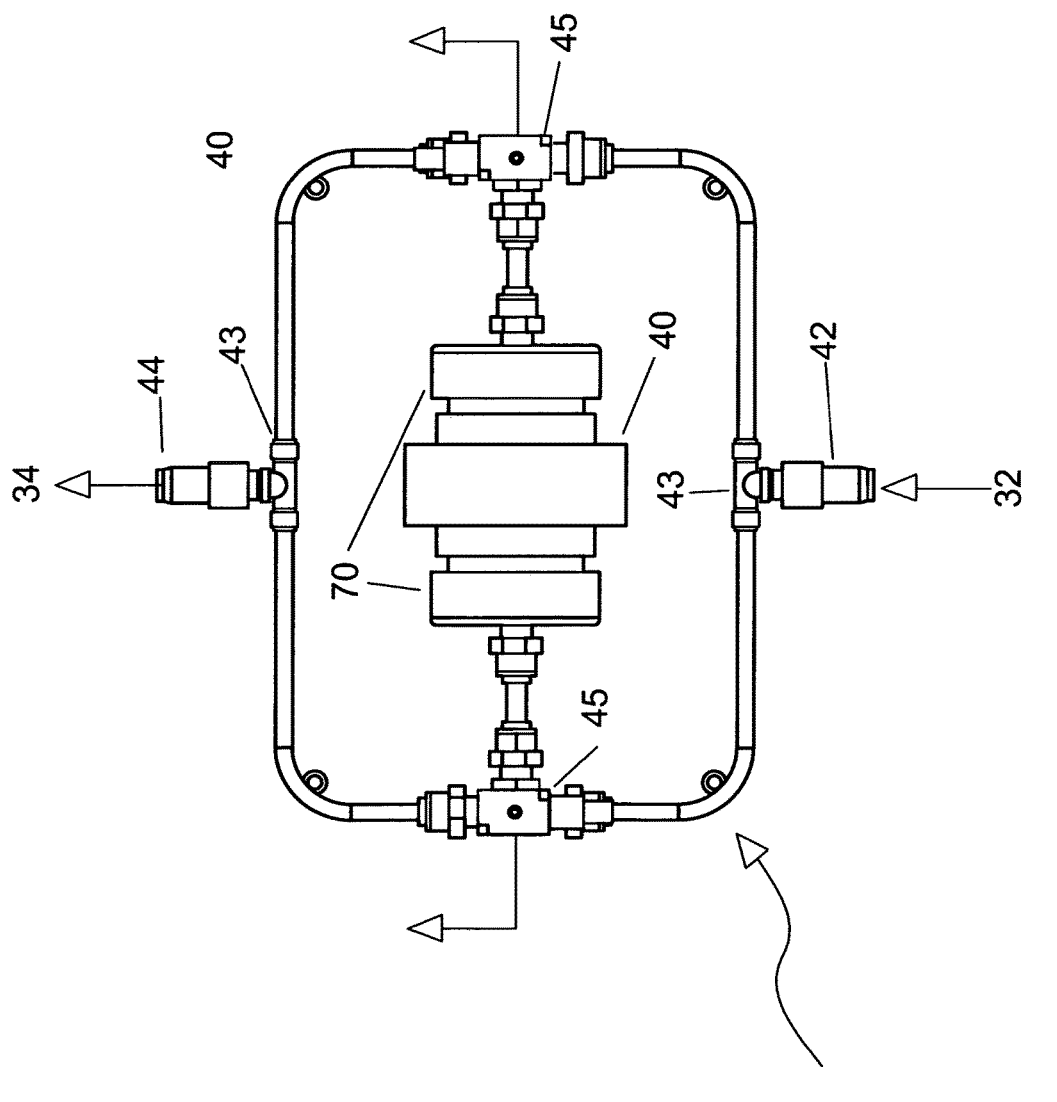
FIG. 3 is a top plan view of the metering system 20 of FIG. 2.

Referring now in conjunction with FIG. 2-3, a preferred embodiment of a metering mechanism 20 for use in the beverage dispensing and pour control system 10 of the present invention is shown in greater detail. The metering mechanism 20 includes a metering chamber 40 that functions as a line pressure powered bi-directional dispenser by redirecting the pressure from one end of the chamber to the other end. Such a chamber 40 allows for accurate, repeatable metering, utilizing and preserving line pressure without the inclusion of an additional pumping device.

The metering mechanism 20 further incorporates a user interface 24 providing for operational control of the metering mechanism 20 including delivering a metered volume of liquid to the tap 20. As would be apparent to a person having ordinary skill in the relevant art, such a user interface 24 may include many types of communication systems for control of the system 10. These may include a visual (video) display, a keyboard, a mouse, and the like. As presently shown, an exemplary user interface 24 is shown simply as a series of operator manipulated buttons, with interactions visually validated through sequences of blinking lights. The metering mechanism 20 may further include wireless communication capability to communicate with a standard PC or smartphone using the wireless protocol (such as Bluetooth, Wi-Fi, Internet, etc.).

Bulk beverages from a number of sources may be metered upon demand as urged through the metering chamber 40 of an identified volume by a single system pressure generated from fluid communication with the bulk beverage container 30. In addition to eliminating the need to provide an accurate (rather than estimated) dispensed volume of various beverages, the present invention may also provide for the discharge to be dispensed at a temperature correlated as appropriate for the differing dispensed beverages (as described in greater detail below). With such operational characteristics, the present system 10 may provide a unique quality and quantity control can be easily accomplished, tracked and reported.

Figure 4:
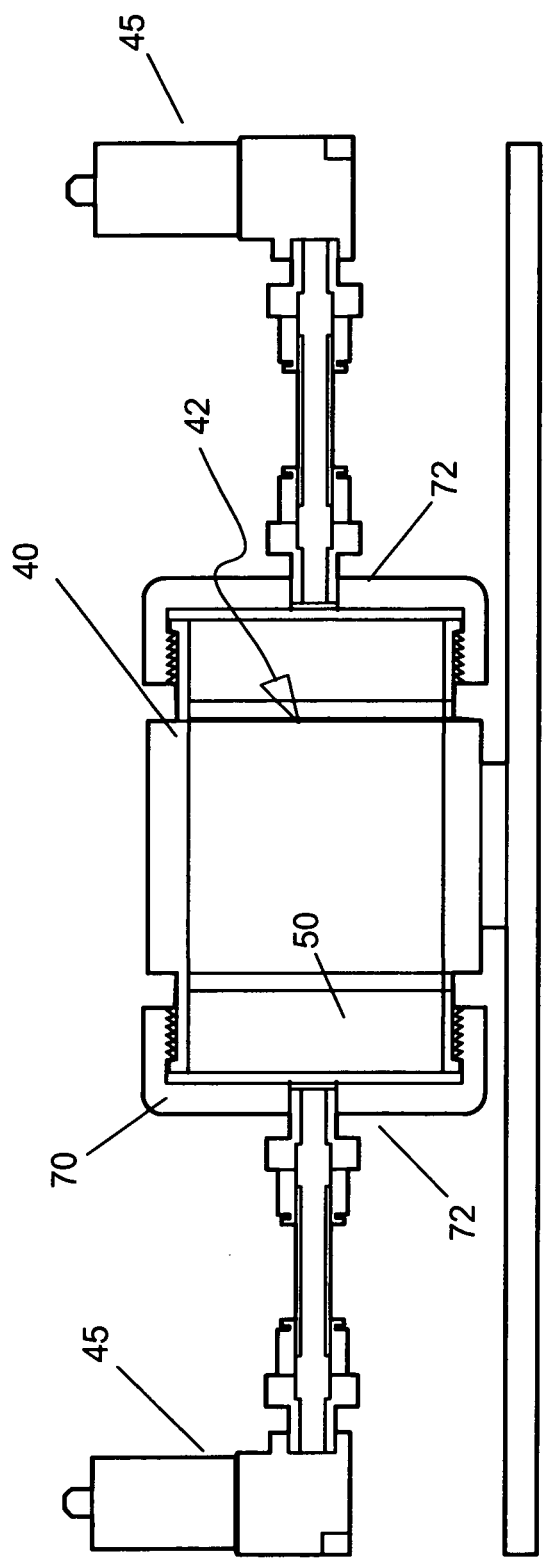
FIG. 4 is a cross sectional view taken along line IV-IV of FIG. 3.
Figure 5C:
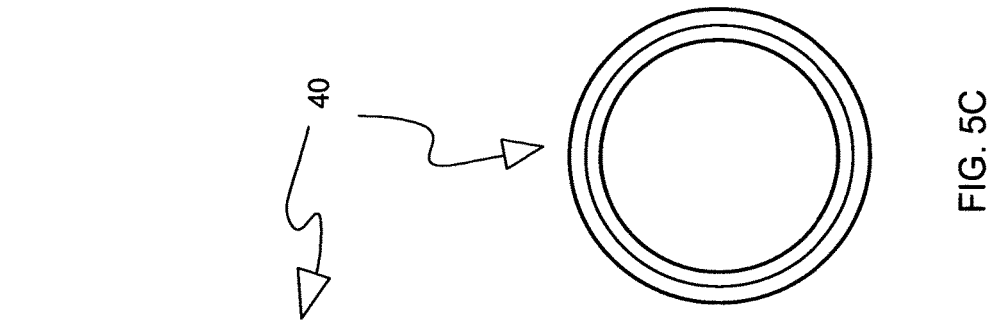
FIG. 5c is a side elevational view thereof.
Figure 5A:
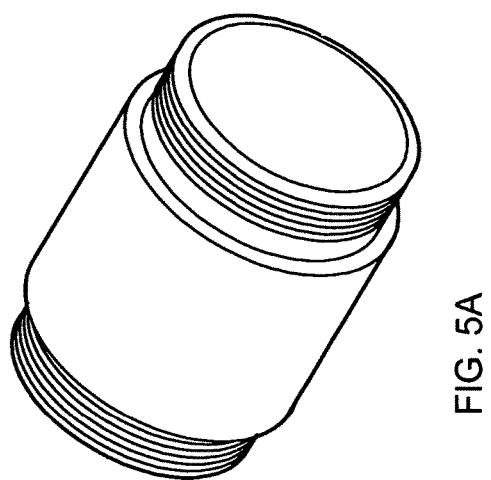
FIG. 5a is a perspective view of a metering cylinder 40 for use within the metering system 20 of FIG. 2-4.
Figure 5B:
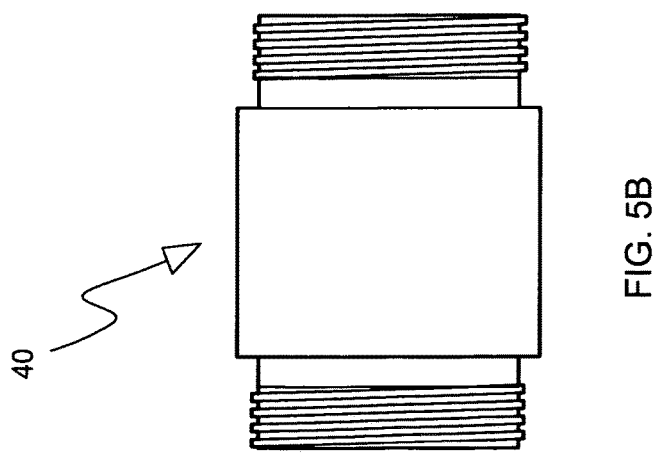
FIG. 5b is a top plan view thereof.
Figure 6B:
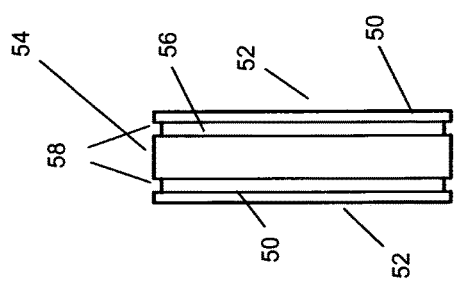
FIG. 6b is a top plan view thereof.
Figure 6D:
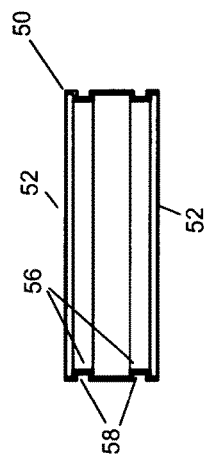
FIG. 6d is a cross sectional view taken along line VI-VI of FIG. 6c.
Figure 6A:
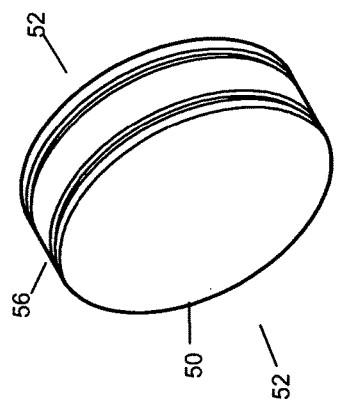
FIG. 6a is a perspective view of a disc shaped piston 50 for use within the metering system 20 of FIG. 2-4.
Figure 6C:
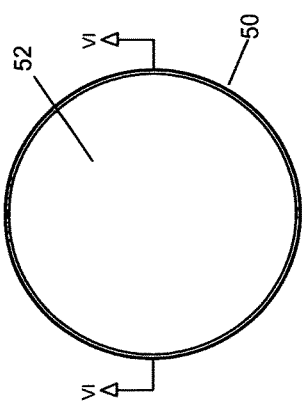
FIG. 6c is a front elevational view thereof.

Referring now further in greater detail in conjunction with FIG. 4-5, the chamber 40 is provided in the form of a container having a selected, defined internal volume 42. The chamber 40 is shown embodied as a cylindrical container; however, it should be noted that such a shape and configuration is not intended to be limiting to the present invention. As will be described in greater detail below, according to an aspect of the present invention the defined volume 42 may be equal to the volume of a desired beverage pour. Further, according to another aspect of the present invention the defined volume 42 may be equal to a fractional component of the volume of a desired beverage pour, thereby facilitating its use with mixed or blended drinks. Further still, according to yet another aspect of the present invention the defined volume 42 may be equal to a multiple of the volume of a desired beverage pour, thereby allowing for multiple dispenses from each reciprocating cycle.

The internal volume 42 houses and contains a piston 50 adapted to match the cross sectional shape of the chamber 40. The piston 50 freely moves laterally, as urged, in a reciprocating manner about the internal volume 42. As shown in greater detail in conjunction with FIG. 6a-6d, the free floating piston 50 incorporates a pair of parallel, flat face surfaces 52 and a peripheral sealing surface 54. The sealing surface 54 may include a surface sealing mechanism, as shown herein as a pair of ring seal channels 56 that contain and seat a pair of elastomeric ring type seals 58.

Figure 7B:
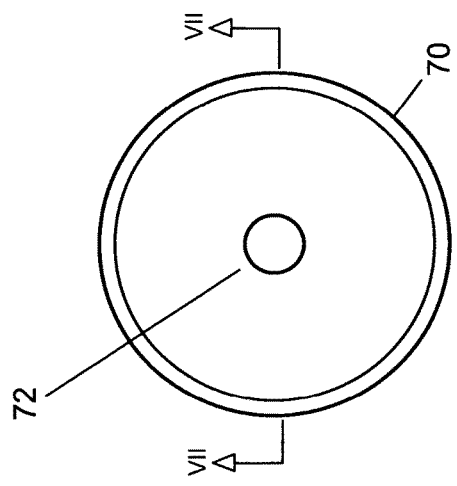
FIG. 7b is a front elevational view thereof.
Figure 7C:
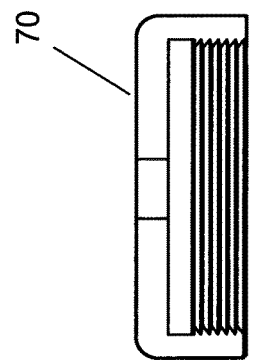
FIG. 7c is a cross sectional view thereof taken along line VII-VII of FIG. 7b.
Figure 7A:
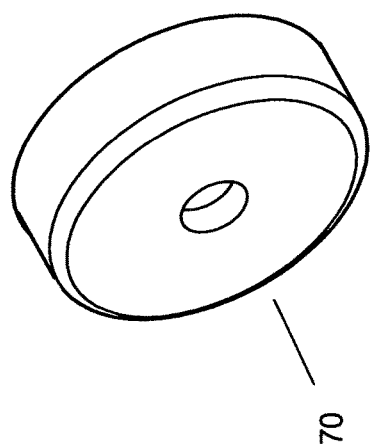
FIG. 7a is a perspective view of a sealing nut 70 for sealing each opposing end of the cylinder 40 of FIG. 5a-5c.
Figure 8:
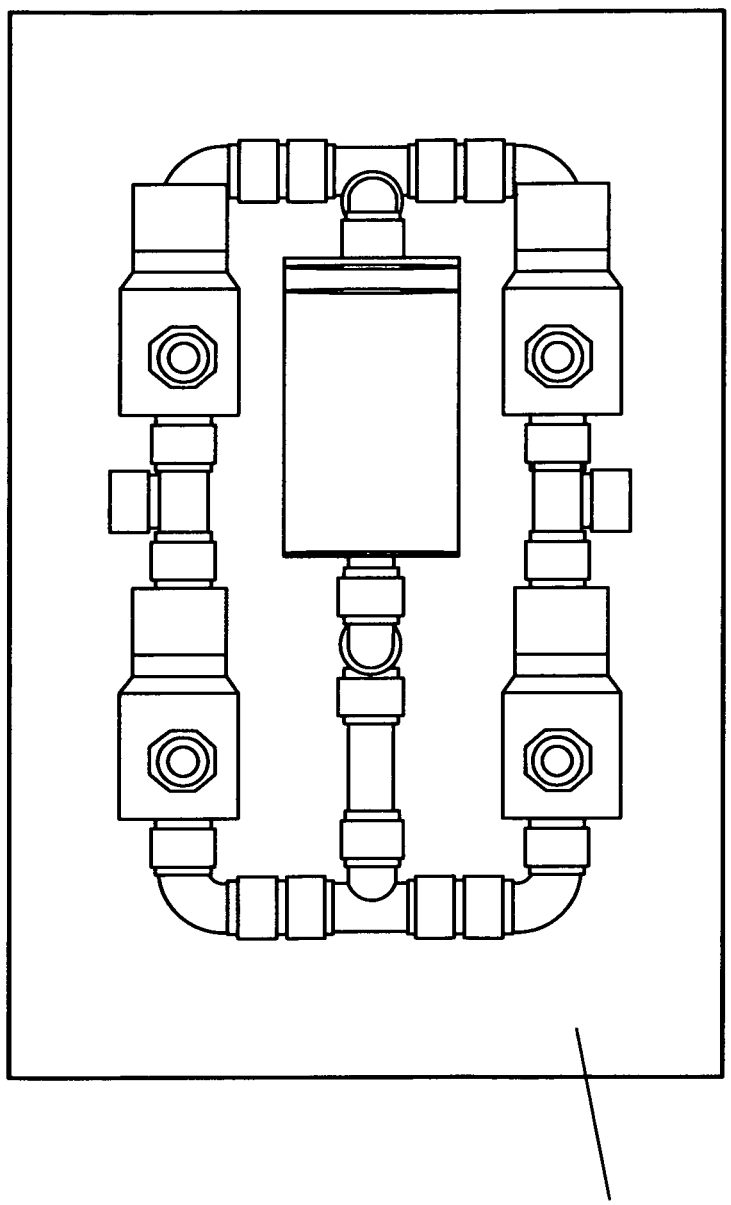
FIG. 8 is a top plan photograph of an operational proof of concept prototype of a metering system is shown embodying the design, function, teachings and features of the metering system 20 of the present invention.
Figure 9:
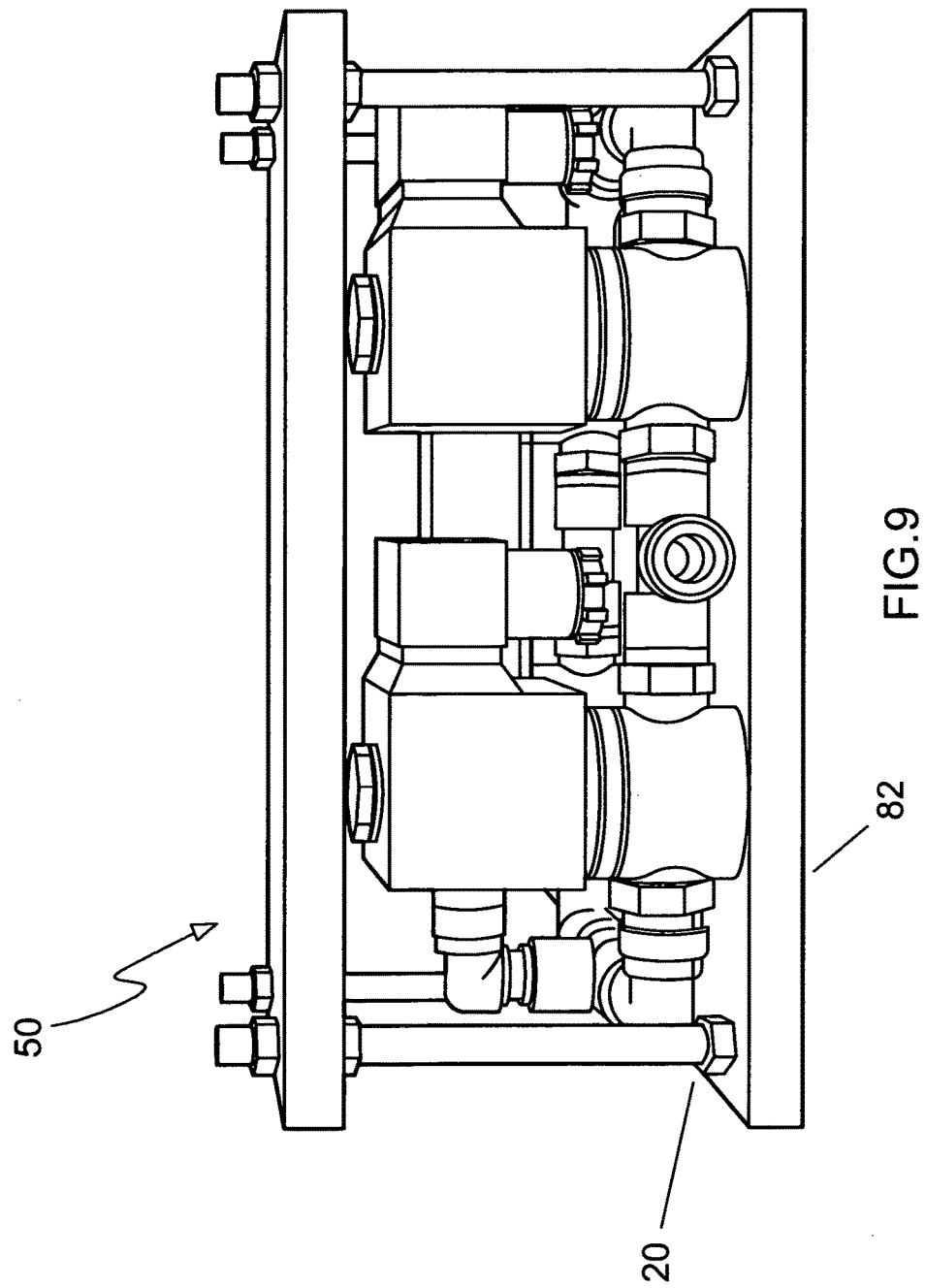
FIG. 9 is a side elevational photograph thereof.
Figure 10:
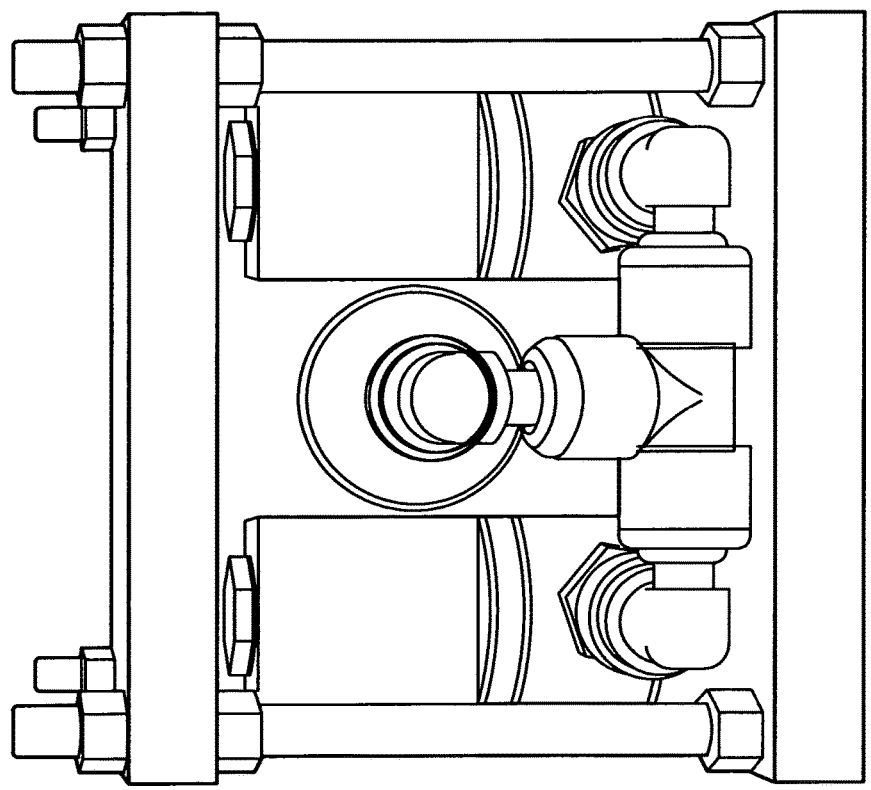
FIG. 10 is a front elevational photograph thereof.
Figure 11:
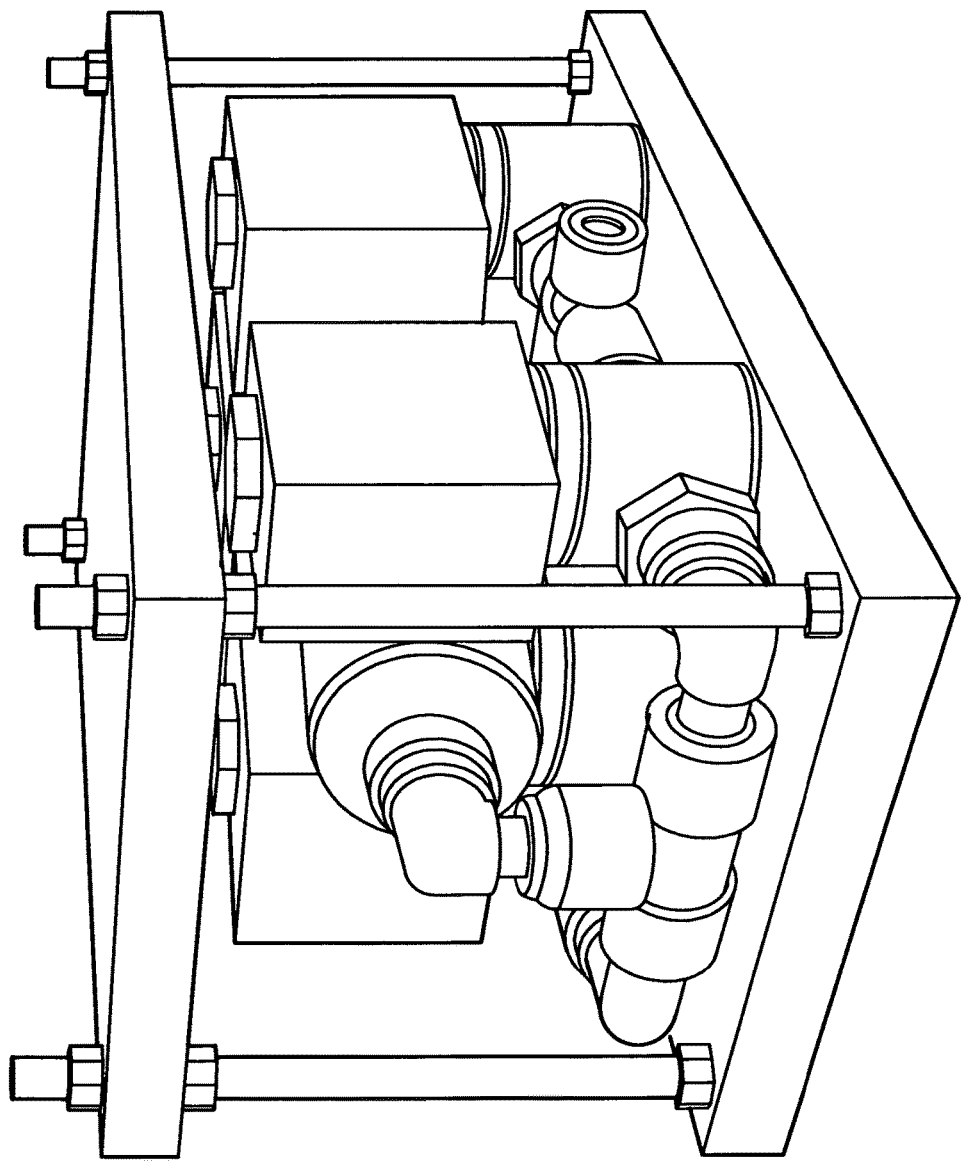
FIG. 11 is a front perspective photograph thereof.

The chamber 40 is sealed at each opposing end, shown herein by a sealing nut 70 as shown additionally in conjunction with FIG. 7a-7c. Each nut 70 engages with and seals a respective end of the chamber 40 and further forms an egress port 72. It should be apparent to a person having ordinary skill in the relevant art, in light of the present teachings, that such a configuration for the chamber 40 is merely exemplary, and that a variety of configurations may be employed that provide an equivalent element functionality.

As described above, the metering mechanism 20 provides for a fluid communication input from the beverage supply 32, and a fluid communication discharge to the metered discharge 34. According to a preferred embodiment of the present invention, an input 42 is in connection with the beverage supply 32, and further includes a flow splitter 43 that directs a flow conduit to each egress port 72. Similarly, an outlet 44 is in connection with the metered discharge 34 and further includes a similar flow splitter 43 that directs a flow conduit from each egress port 72. A three-way switching valve 45 is operatively connected between the input 42, outlet 44 and metering cylinder 40 in order to provide alternating and symmetric flow paths through the metering cylinder 40. As should be apparent to a person having ordinary skill in the relevant art, in light of the present disclosure, the particular arrangement of valves and flow splitters may be adapted to a number of configurations, as long as existing line pressure is maintained while flow is alternately redirected between the opposite sides of the chamber 40 without changing or adding the pressure setup in-line. By way of example, and not as a limitation, alternate configurations for a single chamber design may be accomplished with four 2-way valves; two 3-way valves; one 4-way valve; or an equivalent manifold configuration incorporating another means of redirecting pressure.

Example 1

As shown in FIG. 8 through FIG. 11, an operational proof of concept prototype of a metering system is shown embodying the design, function, teachings and features of the metering mechanism 20 of the present invention. As shown herein, the metering mechanism 20 is provided in a modular block 80 and affixed to a mounting plate 82. As will be described in greater detail below, the modular block 80 may be subsequently configured and assembled to provide a plurality of metering mechanisms 20 in a vertically stacked arrangement that would provide for multi-line flow metering, while maintaining a compact form factor that is adapted for the systems particular use, namely, within tight or limited quarters provided by conventional concessions stands, bars, or other beverage dispensing environments about public venues.

It should be noted that the above described configurations and examples are provided for enabling a preferred embodiment, but are not intended to be comprehensive or limiting. It should be apparent to a person having ordinary skill in the relevant art, and especially those in the hospitality industries in which the commercial dispensing of regulated beverages in medium, large or outdoor live hospitality venues, that the particular configurations may vary from those examples provided, but that such variation should be considered within a broad scope of equivalents that is and is intended to be within the present invention. Adaptations in hydraulic flow path or electrical control schema would be foremost considered as with such range of equivalents. However, such adaptations should not be considered exhaustive in that other variations or adaptations may be included while still incorporating the key aspects of the present inventive function. By way of example, and not intended as a limitation, one such adaptation may include the incorporation of a metering chamber 40 having a metered volume 42 in a greater quantity or multiple of an intended dispense pour volume such that numerous dispensed volumes may be provided within each bidirectional stroke of the piston 50. Another similar adaptation may include the incorporation of a metering chamber 40 having a metered volume 42 in a fractional quantity of an intended dispensed pour volume, such that the automation of accurately blended multi-component cocktails may be accomplished through an integrated multi-line pour control system incorporating broadly the present teachings and features.

A further adaptation may a provide a bulk beverage control system that may deliver multiple different beverage types with each being able to be delivered at an appropriate service temperature. By way of additional detail, for example, when it comes to serving temperature it is commonly accepted that a wine has an appropriate service temperature: if too warm the wine's alcohol will be emphasized, leaving it flat and flabby; and, if too cold the aromas and flavors will be muted and, for reds, the tannins may seem harsh and astringent. General guidelines for appropriate service temperatures include:

Light dry white wines, rosés, and sparkling wines being served at between 40° to 50° F.;

Full-bodied white wines and light, fruity reds being serve at between 50° to 60° F.;

Full-bodied red wines and Ports being served at 60° to 65° F.

Further still, beers may be considered best if served either warmer or colder (depending upon type and cultural preference) and mixed cocktails are generally considered best if served colder. In order to accommodate such a variation in service temperatures the present invention may accommodate such differences based upon beverage dispensed by providing a chilled beverage input to the metering system at the coldest temperature within the range, in addition to subsequently heating the dispensed beverage back to within a preferred temperature range. This post-heating may occur at the metering system discharge or directly at the tap and can be done easily through piezoelectric heating of the dispensed metered liquid. By way of further clarifying example, if both red and white wine are dispensed, by storing or chilling the metering volume to between 40° to 50° F., and post heating just the red wines to be between 50° to 60° F., or to between 60° to 65° F. for fully body reds or ports, the proper service temperature may be accomplished automatically through a common bulk dispensing system.

As part of and in addition to the control of the quality and quantity of servings delivered by an operator, a beverage dispensing and pour control system 10 may provide precise measurement of each portion, warn the operator about beverage tank low level, force flashing of the poor quality beverage and record delivery process events in a log for use by management. The functions and operational characteristics may be further seen in conjunction with the examples described herein below.

2. Operation of the Preferred Embodiment

Figure 12:
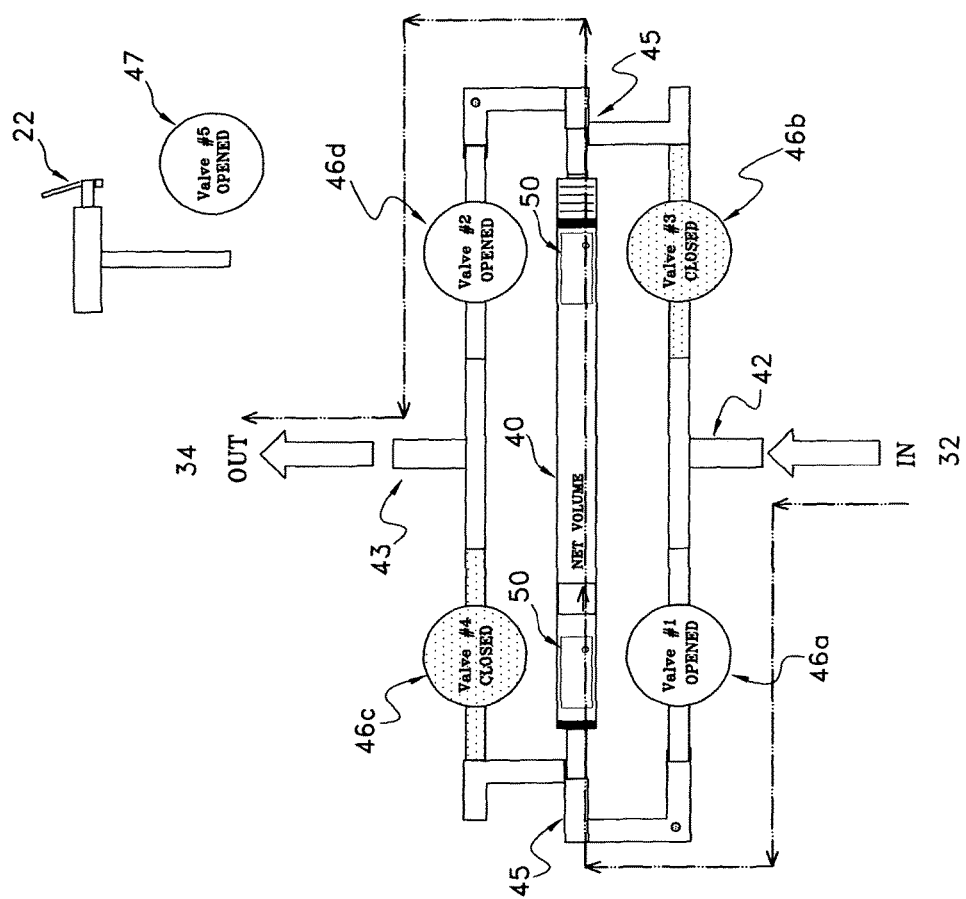
FIG. 12 is a hydraulic schematic of the first exemplary typical operation of a beverage dispensing station 10 for use according to the present invention showing a first dispensing cycle.
Figure 13:
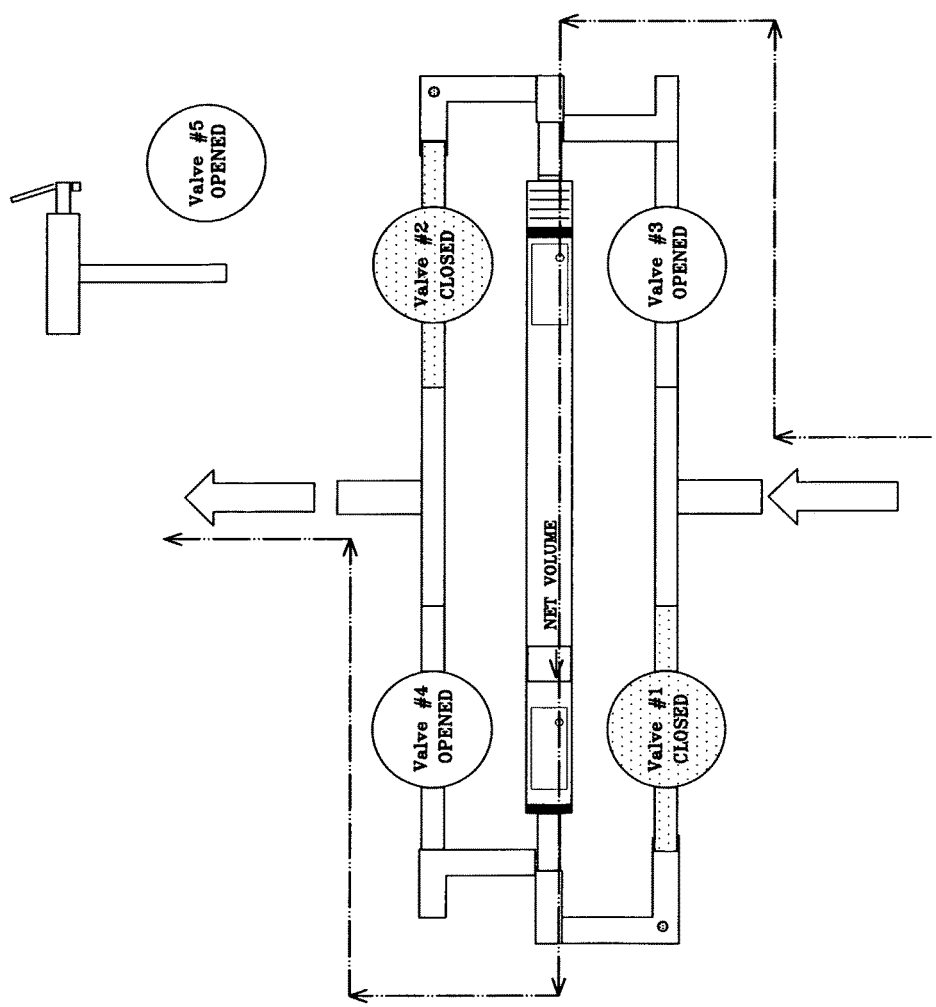
FIG. 13 is a hydraulic schematic of the first exemplary typical operation of a beverage dispensing station 10 for use according to the present invention showing a second dispensing cycle.

Referring in conjunction with FIGS. 12 and 13, a hydraulic schematic of a first exemplary typical operation of a beverage dispensing and pour control system 10 for use according to the present invention is shown. As shown in FIG. 12, a first portion is metered from the inlet 32 under line pressure and directed to a first inlet of the chamber by positioning of one valve 46a open and another valve 46b closed. Closure of valve 46c forces fluid in to the chamber 40 and caused the piston 50 to move from a first position to a second position. The opening of valve 46d causes fluid originally in the chamber 40 to be dispensed out through the outlet 34. As shown in FIG. 13, subsequent metered volumes can be discharged by reversal of valve positions 46a, 46b, 46c, and 46d. It is envisioned that the valves 46 may be controlled by a dedicated collocated or remote microcontroller. While such a system will maintain volume within the discharge 34 through to the tap or spigot 22, an additional valving mechanism 47 may be incorporated between the metering chamber 40 and the spigot 22 in order to maintain system pressure throughout the entire system 10. This is accomplished by maintaining the valving mechanism 47 open for the full durations of dispensing of one or several net volume portions until the total desire volume is dispensed; then, at the end of closing all other valves 46 by closing valving mechanism 47 before initiation of the next cycle, i.e. reversal of the valve positions of 46a-d, the entire system is pressurized and ready for the next dispensing cycle. It is further envisioned that additional isolation valves may be used to isolate the system's liquid contents from the external environment that would cause spoilage or degradation, or to otherwise prevent the dispensing of foamed beverage for carbonated drinks.

Figure 14:
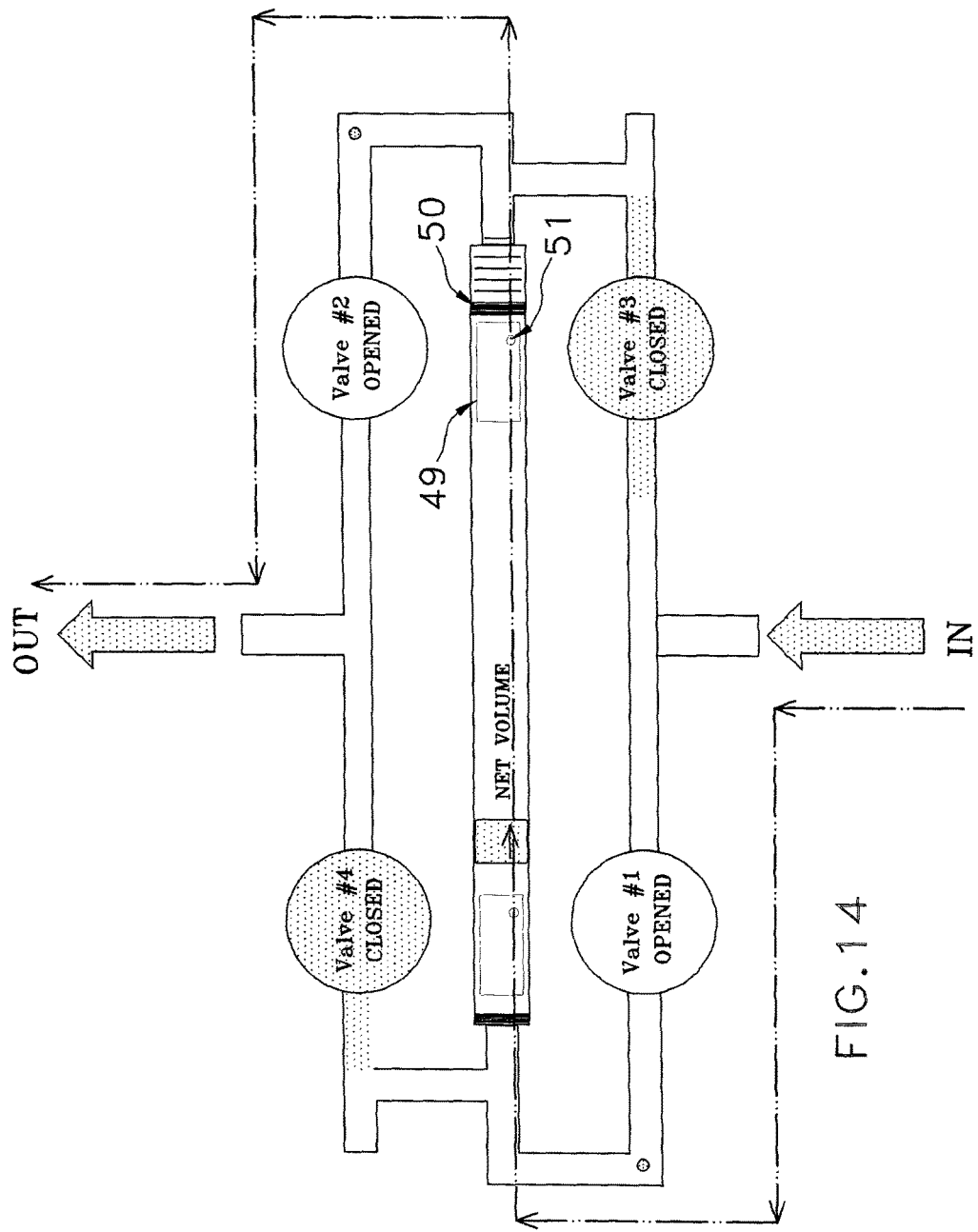
FIG. 14 is a hydraulic schematic of the second exemplary typical operation of a beverage dispensing station 10 for use according to the present invention showing a first dispensing cycle.
Figure 15:
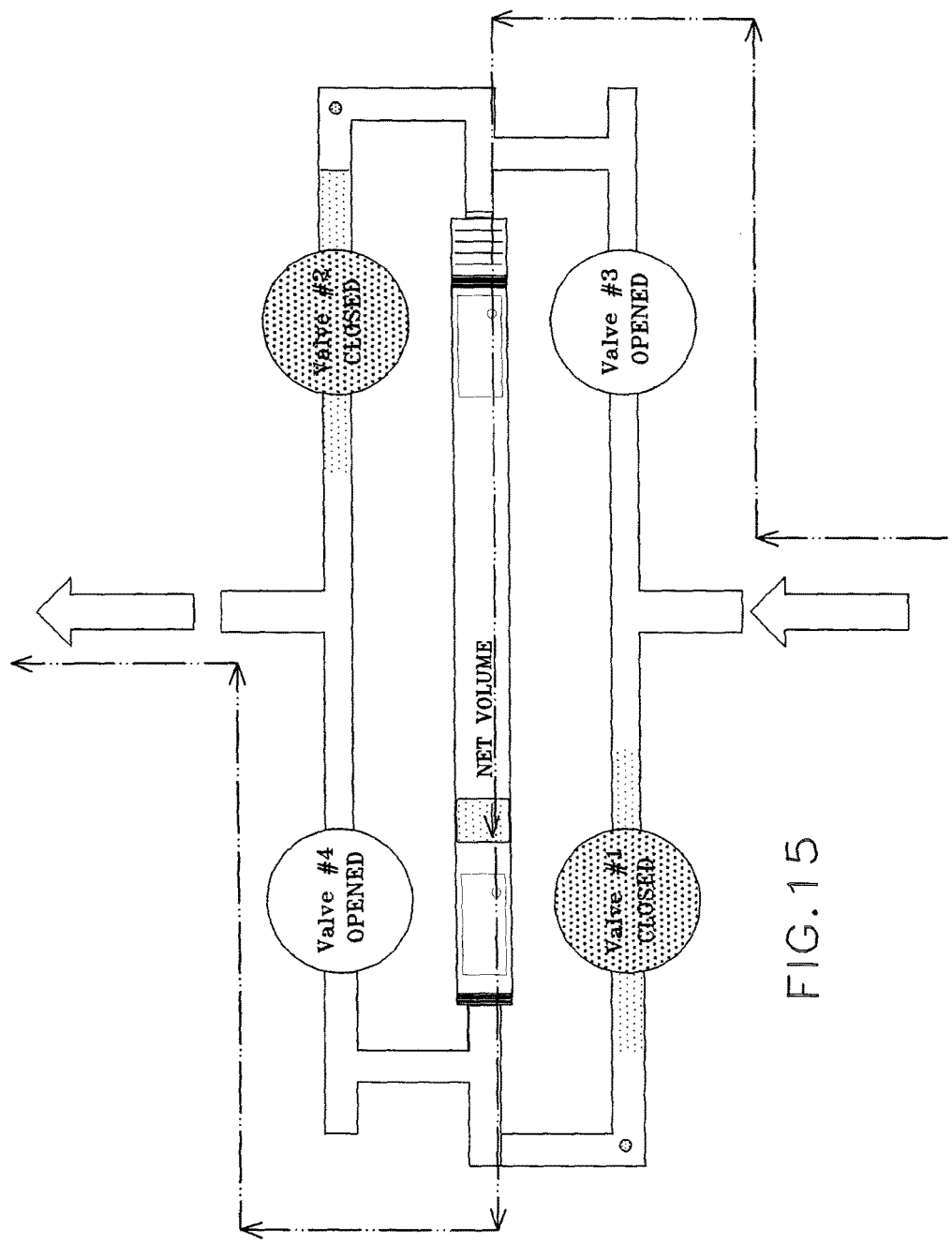
FIG. 15 is a hydraulic schematic of the second exemplary typical operation of a beverage dispensing station 10 for use according to the present invention showing a second dispensing cycle.

Referring now to FIG. 14-15, a hydraulic schematic of a second exemplary typical operation of a beverage dispensing and pour control system 10 for use according to the present invention is shown in which a sensor mechanism 51 is used to detect the position of the piston 50 or a target 49 within the piston within the chamber 40. In such a configuration, operation of the valves 46 are alternated through communication from sensors. The position of said piston 50 within said chamber 40 is detected with a sensor for detecting proximity. Multiple sensors may be positioned along the length of the metering chamber in order to increase precision of positioning the piston. Such sensors may consisting of RF sensors, magnets or halo effect sensors, magnetostrictive, or IR sensors. Such sensors may further be embedded within the chamber such that a sensor target formed in said piston can be quickly, easily, and repeatable detected.

Referring now to FIG. 15, a hydraulic schematic of a third exemplary typical operation of a beverage dispensing and pour control system 10 for use according to the present invention is shown in which a single mixed portion is dispensed. In such a configuration, multiple different input streams are delivered to the metering chamber 40 which then functions additionally as a mixing volume in which fixed volumes of multiple fluid streams are delivered into the chamber 40 at predetermined volumes controlled by opening supply valves at particular times within the movement of the piston 50. As described similarly above, the use of targets and detectors may be utilized for determining the positioning of the piston and controlling the various inlet volumes. In such a variant, the system may be used to automatically meter both the volumes of the individual constituent ingredients of a mixed drink, as well as the overall mixed drink volume.

Figure 16:
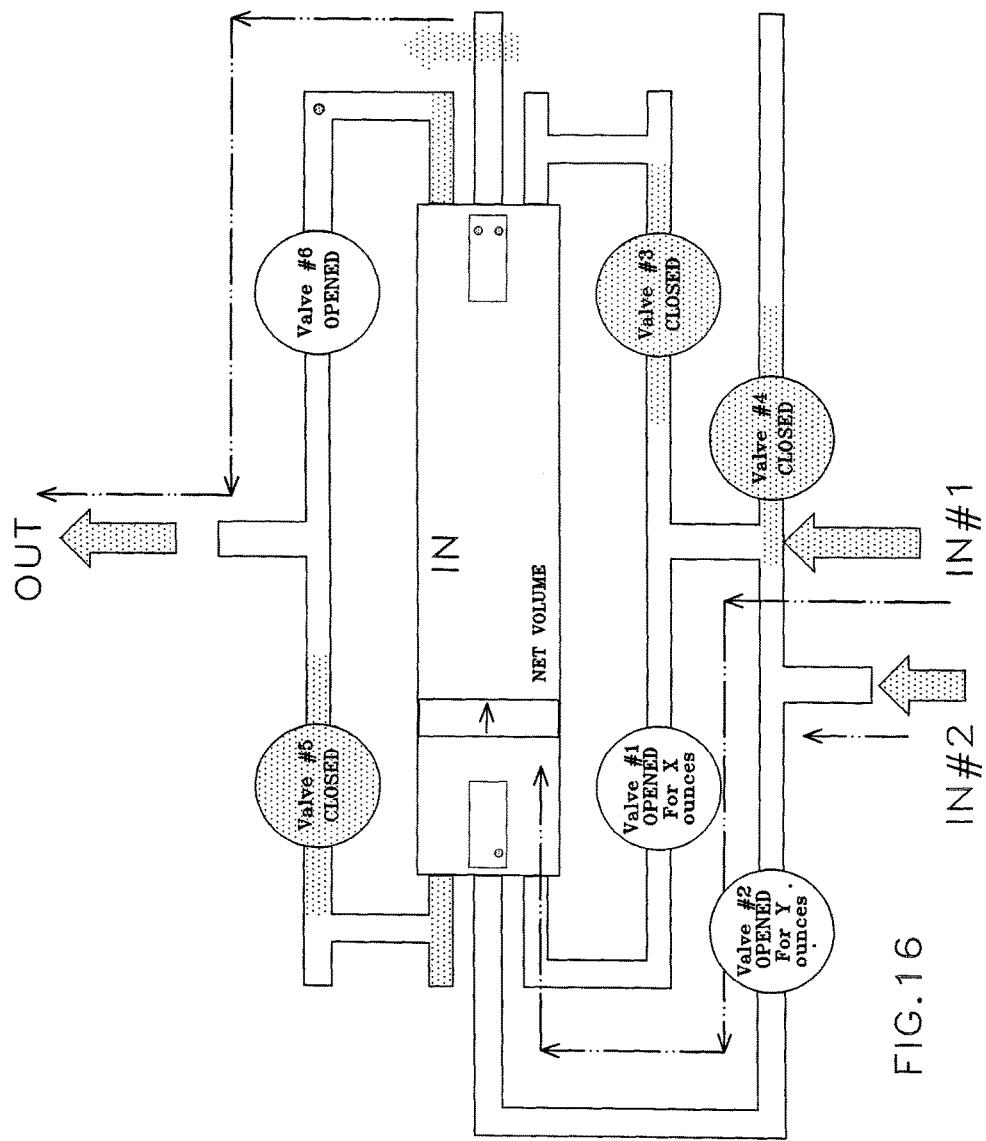
FIG. 16 is a hydraulic schematic of a third exemplary typical operation of a beverage dispensing and pour control system 10 for use according to the present invention is shown in which a single mixed portion is dispensed.
Figure 17:
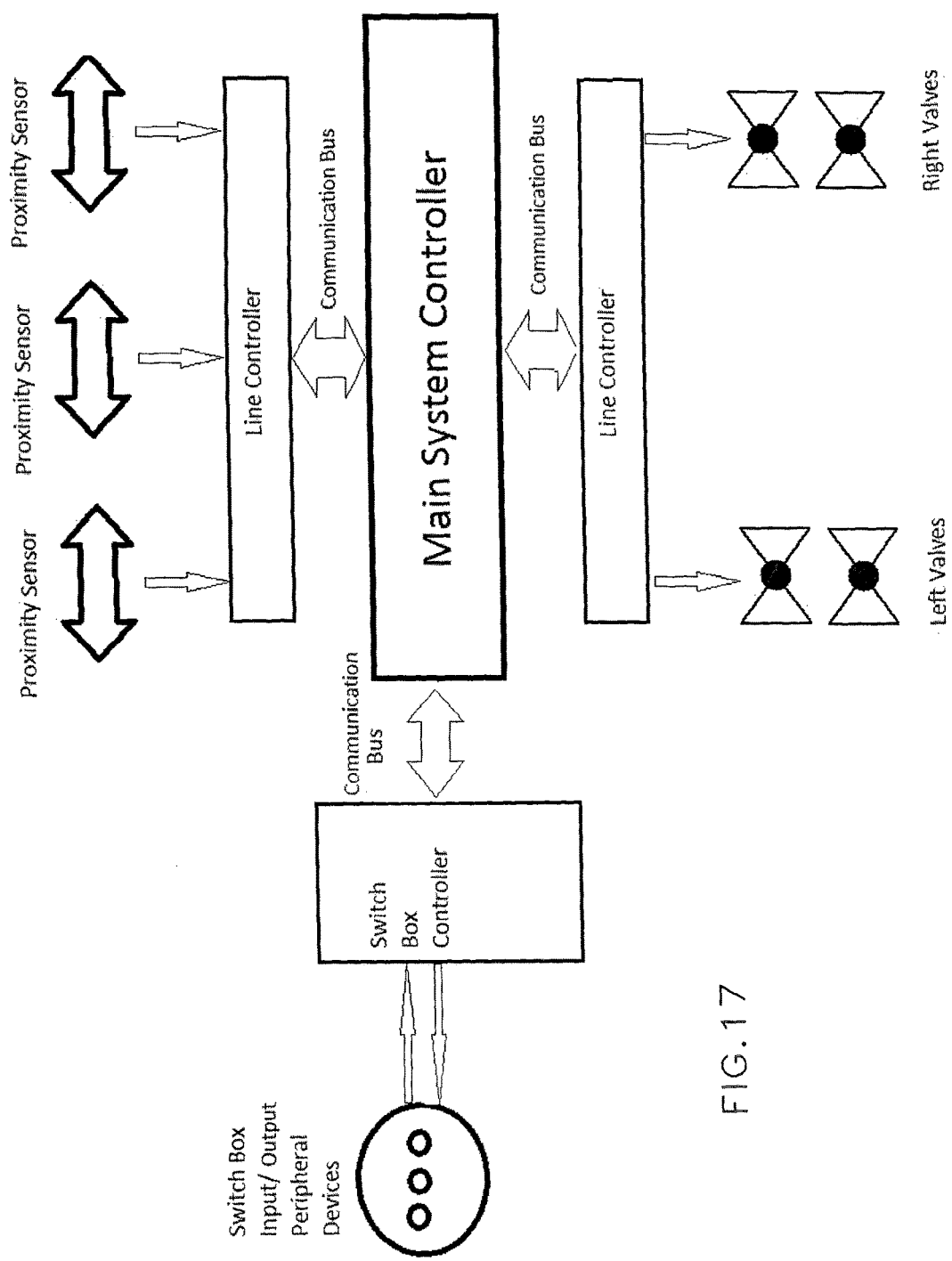
FIG. 17 is a control schematic of a beverage dispensing and pour control system 10 for use with a metering system 20 according to an exemplary preferred embodiment.

Referring now to FIG. 16 an electrical control schematic of a beverage dispensing and pour control system 10 for use with a metering system 20 according to an exemplary preferred embodiment of the present invention in which one line of dispensed beverage is accommodated. Further, FIG. 17 is an electrical control schematic of a beverage dispensing and pour control system 10 for use with a metering system 20 according to an exemplary first alternate embodiment of the present invention in which two lines of dispensed beverage is accommodated. And, FIG. 18 is an electrical control schematic of a beverage dispensing and pour control system 10 for use with a metering system 20 according to an exemplary second alternate embodiment of the present invention in which three lines of dispensed beverage is accommodated. While the features and operations of this variant are similar to that described above, the form factor and placement and number of check valves are shown alternately for equivalent functionality within the system, and those having ordinary skill in the relevant art, in light of the present teachings, may utilize a wide range of modifications within the range of equivalents, including, by not limited to, variations in the number and configurations of electronic elements (i.e. boards, wiring, etc.) or the like.

In operation it is preferable that in a beverage dispensing and pour control system for use with keg wine management should have the ability to control the quality and quantity of servings delivered by the operator. The suggested beverage dispensing and pour control system should also provide precise measurement of each portion, warn the operator about beverage tank low level, force flashing of the poor quality beverage and records all the delivery process events in the log for the management.

Initially the system should be set up in that before the operation, the following parameters may be recorded in the control device memory:

V(t) as the volume of the beverage tank to be dispensed;
V(out) as the volume of the dispensing chamber;
P(low) as percent of the total volume left in the tank to generate the signal; "Low Volume" (usually 10%)
L(in) the length of the input pipe 42;
D(in) the inner diameter of the input pipe 42;
L(out) the length of the output pipe 43;
D(out) the inner diameter of the output pipe 43;
R(min) the minimal pressure necessary for the normal operation of the dispenser (i.e. a pressure below minimal is to be considered as disconnected line during errant operation or keg supply changeover)
V(st) the standard volume of one portion of the beverage to be delivered to the consumer
T(in) the maximum time between the portions for the beverage in the input line to keep its quality (based upon oxidation characteristics of the beverage under operation conditions such as temperature and time)
T(out) the maximum time between the portions for the beverage in the output line to keep its quality During operation, the control unit at the tap/spigot 22 may have several buttons to control the number of portions to be delivered based on the whole system status. The minimum number of buttons is 1; in the presently shown configuration 3 control buttons are shown, marked as:

1) Pour
2) Full Flush
3) Small (Half) Flash.

Additional buttons like "NewTank" may further be added to the interface for additional automated functionality for operational control. A "New Tank" event can also be detected by measuring and analyzing the time required by the piston to complete its full run along the measuring chamber. In such an operation, short duration piston runs that are caused by the presence of air in the chamber may be used to indicate a New Tank event. Alternatively, a "New Tank" event may also be identified utilizing a special sensor measuring changes of the pressure inside the line connecting the tank with the measuring chamber. Each button could indicate its readiness, such as, for example, by lighting up an LED. The system may be able to block the operation of certain buttons depending on the current scenario.

By way of example of the normal intended operation, a standard one portion dispensing event requires the push of the button Pour. The operation of the button could be blocked under several conditions, including the time since the last pouring exceeds the predefined safe time T(out) for keeping the beverage in the output line. Additional 'lock out' operation may further be implemented remotely, though command or program configuration by a user from a web portal, cellular connection, or equivalent. In such a scenario the Small Flash button may be activated (steady lighting up or blinking) and the operation of all other buttons can be blocked. Pushing the Small Flash button initiates the system to calculate the number of cycles of delivery station to flash the output line, executes the cycles and unblocks the Pour button. The event is recorded in the log with the time stamp.

The operation of the button could be blocked under other conditions as well. By way of example, and not as a limitation, such as if the time since the last pour exceeds a predefined safe time T(out) for keeping the beverage in the input line. In such a scenario the Full Flash button can be activated (steady lighting up or blinking) and all other buttons are blocked. Pushing the Full Flash button initiates the system to calculate the number of cycles of delivery station to flash the output line, executes the cycles and unblocks the Pour button. The event is recorded in the log with the time stamp.

In its intended configuration and operation the system should calculate inventory and dispensing statistics, such as, but not limited to: the number of cycles of delivery poured; the number of cycles to flash the input and output line (full and small flash); and the instances of low pressure (or supply keg changeover). These events may be recorded in an output report or log with a time stamp.

Additional output report or log events may include when pressure in the input line falls below the minimum required R(min). Such events indicates either and empty beverage tank or a pump failure (compressor broken, power failure, etc.). The operator may resolve such situations by either pressing the Full Flash button after the pump has been repaired or new tanks connected in order to start the new delivery of a new batch. In the latter case the operator enters the New Tank command using button, The control device either records the Full Flash event or completes the last tank report for delivery to the management by request and prepares for the new tank.

Such log reports are important for the operation. Data acquisition can provide valuable inventory information and allow the user to maintain an optimum operational efficiency. By way of example, and not meant as a limitation, such a log report may appear in following format of TABLE 1, or similar, and include information shown and described throughout this describing.

TABLE 1

| Jun. 15, 2014 | 11:46:35 AM | New Tank |
|---|---|---|
| Jun. 15, 2014 | 11:46:59 AM | Pressure Normal |
| Jun. 15, 2014 | 11:50:33 AM | Standard Pour |
| Jun. 15, 2014 | 11:51:33 AM | Standard Pour |
| Jun. 15, 2014 | 11:52:33 AM | Standard Pour |
| Jun. 15, 2014 | 3:31:22 AM | Small Flash (4 hr 39 min since last pour) |
| Jun. 15, 2014 | 3:35:22 AM | Standard Pour |
| Jun. 15, 2014 | 3:37:22 AM | Standard Pour |

It should also be noted that a "standard pour" may consist of multiple individual piston cycles, and as such a record log may additional include an indication of the direction of piston travel, dispensed volume, and also cycle time for the travel of the piston.

It should be noted that a beverage dispensing station as described and disclosed above may provide a control device with ability to record such operating and inventory information on a permanent [magnetic] media, or may include a user interface incorporating an LCD display for graphic output as well as for use with a [virtual] keyboard for information exchange between the control device and operator. Additional option may include a wireless board to communicate with a standard PC or smartphone in order to upload records or logs in realtime using the wireless protocol (Bluetooth, Wi-Fi, Internet, etc.) or otherwise remotely reporting operation conditions, report output, alarms or the like.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical,* 520 US 17 (1997) or *Festo Corp. v. Shoketsu Kinzoku Kogyo Kabushiki Co.,* 535 U.S. 722 (2002), or other similar case-law or subsequent precedent should not be made if any future claims are added or amended subsequent to this or any prior parent patent application.

What is claimed is:

1. A dispensing and pour control system for a regulated beverage from a bulk storage and distribution system for a pressurized beverage, said dispensing and pour control system comprising:
    a beverage supply in operative connection with said bulk storage and distribution system;
    a spigot or tap for discharging said regulated beverage into and in coordination with a drinking container; and
    a metering mechanism in between and in fluid communication with both said beverage supply and said spigot or tap, said metering system including an unsealed volume in continuous hydrodynamic connection with said beverage supply and adapted for providing a series of uninterrupted specific selected volumetric discharges in fluid communication with said tap or spigot in a manner that provides for said beverage to be discharged as a series of individually metered volumes delivered as a continuous and uninterrupted fluid flow;
    wherein said metering mechanism operatively utilizes solely pressure from said bulk storage as a motive force while maintaining a system pressure through a continuous system fluid volume within said storage and distribution system between dispensing cycles.

2. The dispensing and pour control system for a regulated beverage of claim 1, wherein said metering mechanism comprises:
    a chamber forming an identified internal volume and adapted to function as a line pressure powered bi-directional metering volume, said chamber providing a defined internal volume;
    a free flowing piston contained within said internal volume in a reciprocating manner about a majority of the internal volume, wherein said piston comprises a pair of parallel face surfaces and circumscribed by a perimeter surface, said piston bifurcating said internal volume into separate hydraulically connected segments in a manner that allows the piston to move at a velocity coordinated with a movement of the beverage through the chamber;
    a closeable ingress or egress portal engaged to each respective end of the chamber; wherein successive discharges and speed of discharges from said defined internal volume are measured by a position and a speed of said piston and provides for a both a fluid communication input from said bulk storage and distribution system and a fluid communication output with a continuous metered discharge to said tap or spigot.

3. The dispensing and pour control system of claim 2, wherein said fluid communication output in connection with the metered discharge and further comprises:
    a first flow splitter that directs a flow conduit from each egress portal;
    a second flow splitter that directs a flow conduit to each inlet portal;
    switching valving operatively connected between the input and outlet of said metering chamber for providing alternating flow paths through the metering chamber;
    wherein a flow through the metering chamber is thereby alternated in direction in a manner that prevents said free flowing piston from impinging against either end of said metering chamber.

4. The dispensing and pour control system of claim 3, further comprising an on/off valve between said metering mechanism and said tap or spigot for maintaining an elevated line pressure after dispensing a volume.

5. The dispensing and pour control system of claim 2, wherein a desired beverage pour is approximately equal to a combination of a fraction of or a multiple of said defined internal volume.

6. The dispensing and pour control system of claim 2, said metering system further comprises at least a second fluid communication input from at least a second bulk storage and distribution system in fluid communication output with said metered continuous discharge to said tap or spigot;
    wherein said first fluid communication input and said at least a second fluid communication input mix within said internal volume, said defined internal volume further being approximately equal to a whole fraction of a total volume of a desired beverage pour for use in mixed or blended drinks.

7. The dispensing and pour control system of claim 2, wherein:
    said defined internal volume is a multiple of the volume of a desired beverage pour;
    said metered discharge is created by alternating line pressure a within said chamber; and
    measurement of said metered discharged is determined from the measured movement of said piston.

8. The dispensing and pour control system of claim 3, wherein said piston within said chamber is detected with sensors located along a shuttle path of said piston within said chamber for detecting the piston's location, position or speed along points of a length of said chamber sufficient to detect fractions of said metered discharge.

9. The dispensing and pour control system of claim 8, wherein said sensors are selected from the group consisting of: RF sensors; magnets; hall effect sensors; near field effect sensors; and IR sensors.

10. The dispensing and pour control system of claim 9, wherein said sensors are within or in proximity with said chamber and a sensor target is formed in or by said piston.

11. The dispensing and pour control system of claim 8, wherein a dispensed volume of said continuous metered discharge to said tap or spigot is selected from the group consisting of ½ fluid ounce increments.

12. The dispensing and pour control system of claim 1, wherein said system further comprises, in combination:
    automated pouring and dispensing; and
    integrated point of sale data acquisition for determining inventory usage statistics.

13. A dispensing and pour control system for a regulated beverage from a bulk storage and distribution system for a pressurized beverage, said dispensing and pour control system comprising:
    a chamber forming an identified defined internal volume and having a first end opposite a second end;
    a piston contained within said internal volume, said piston being freely movable laterally, as urged, in a reciprocating manner about the internal volume between near said first end and near said second end;

said piston having a pair of parallel face surfaces and circumscribed by a perimeter said piston bifurcating said internal volume into separate hydraulically connected segments in a manner that allows the piston to move at a velocity coordinated with a movement of the beverage through the chamber;

at least one sensor for detecting said piston's location, position or speed;

a closeable ingress or egress portal engaged to each said first end and said second end the chamber, said ingress or egress portals actively throttle fluid flow in a manner related to said at least one sensor's identification of said piston's detection;

wherein said piston thereby functions as a line pressure powered bi-directional metering volume for identifying successive discharges from said defined internal volume as urged by said piston for continuously metering discharges between said bulk storage and distribution system and a tap or spigot.

14. The dispensing and pour control system of claim 13, wherein said metering mechanism operatively utilizes pressure from said bulk storage as a motive force for movement of said piston in conjunction with movement of said beverage while maintaining a system pressure within said storage and distribution system between dispensing cycles while said beverage is discharged as a series of individually metered volumes delivered as a continuous and uninterrupted fluid flow into a drinking container that is coordinated the beverage being discharged.

15. The dispensing and pour control system of claim 13, wherein said fluid communication output in connection with the metered discharge and further comprises:

a first flow splitter that directs a flow conduit from each egress portal;

a second flow splitter that directs a flow conduit to each inlet portal;

switching valving operatively connected between the input and outlet of said metering chamber for providing alternating flow paths through the metering chamber;

wherein a flow through the metering chamber is thereby alternated in direction in a manner that prevents a creation of any trapped fluid volumes within said metering chamber.

16. The dispensing and pour control system of claim 15, further comprising an on/off valve between said metering mechanism and said tap or spigot for maintaining an elevated line pressure after dispensing a volume.

17. The dispensing and pour control system of claim 13, wherein a desired beverage pour is approximately equal to a combination of a fraction of or a multiple of said defined internal volume.

* * * * *